United States Patent [19]
Adkins et al.

[11] Patent Number: 5,525,683
[45] Date of Patent: Jun. 11, 1996

[54] ETHER-LINKED AMINE-TERMINATED POLYESTERS AND A PROCESS FOR THEIR PRODUCTION

[75] Inventors: Rick L. Adkins, New Martinsville; William E. Slack, Moundsville, both of W. Va.; Rudolf Sundermann, Leverkusen, Germany

[73] Assignees: Bayer Corporation, Pittsburgh, Pa.; Bayer Aktiengesellschaft, Leverkusen, Germany

[21] Appl. No.: 343,292

[22] Filed: Nov. 22, 1994

[51] Int. Cl.$^6$ .................................................. C08F 20/00
[52] U.S. Cl. ........................ 525/437; 524/81; 524/167; 524/401
[58] Field of Search ................ 525/437; 524/81, 524/167, 401

[56] References Cited

U.S. PATENT DOCUMENTS

| | | | |
|---|---|---|---|
| 4,169,206 | 9/1979 | Mazanek et al. | 560/50 |
| 4,186,257 | 1/1980 | Blahak et al. | 521/159 |
| 4,328,322 | 5/1982 | Baron | 521/163 |
| 4,732,959 | 3/1988 | Otani et al. | 528/68 |

*Primary Examiner*—Samuel A. Acquah
*Attorney, Agent, or Firm*—Joseph C. Gil; Lyndanne M. Whalen

[57] ABSTRACT

Ether-linked amine-terminated polyesters are produced by reacting (1) a polyester polyol in which substantially all of the hydroxyl groups have been replaced with good leaving groups with (2) an aminoalcohol and/or aminothiol and (3) a deprotonating agent. The aminopolyesters obtained by this process are characterized by excellent reactivities over a wide range of molecular weights and functionalities.

13 Claims, No Drawings

ETHER-LINKED AMINE-TERMINATED POLYESTERS AND A PROCESS FOR THEIR PRODUCTION

BACKGROUND OF THE INVENTION

The present invention relates to a process for the production of ether-linked amine-terminated polyesters and to the polyesters obtained by this process.

Amine terminated polyesters and processes for their production are known. See, for example, U.S. Pat. Nos. 4,525,521; 4,785,054; and 5,290,848 in which amine terminated polyesters are described as being useful components for coating compositions. These prior art amine terminated polyesters are produced by processes in which the carboxyl groups of an acrylic polymer are reacted with (1) an alkylene imine (U.S. Pat. Nos. 4,525,521 and 5,290,848) or an alkyl amine (U.S. Pat. No. 4,785,054) to produce polymers having pendent amino ester groups or (2) ammonia (U.S. Pat. Nos. 4,525,521 and 5,290,848) to produce polymers having pendent hydroxy amino ester groups. The conditions required for these processes vary from low temperature, low pressure processes to high pressure processes, depending upon the specific reactants used.

SUMMARY OF THE INVENTION

It is an object of the present invention to provide a new method for producing ether-linked amine-terminated polyesters.

It is another object of the present invention to provide a method for producing ether-linked amine-terminated polyesters in which relatively mild reaction conditions are required.

It is a further object of the present invention to provide a process for producing ether-linked aliphatic or aromatic amine-terminated polyesters.

It is also an object of the present invention to provide a process for producing aromatic ether-linked amine-terminated polyesters in which the terminal amino group(s) may be located at the position which is ortho, meta or para to the ether linkage.

It is another object of the present invention to provide ether-linked amine-terminated polyesters characterized by excellent reactivity over a wide molecular weight and functionality range.

These and other objects which will be apparent to those skilled in the art are accomplished by reacting a polyester polyol in which substantially all of the hydroxyl groups have been converted to leaving groups (also referred to herein as "the converted polyester polyol") with an aminoalcohol and/or aminothiol and a compound that is capable of deprotonating the hydroxy group of the aminoalcohol or aminothiol.

DETAILED DESCRIPTION OF THE PRESENT INVENTION

The present invention relates to a process for the production of ether-linked amine-terminated polyesters. In this process, a polyester polyol in which substantially all (i.e., at least 75%) of the hydroxyl groups have been replaced with good leaving groups (i.e., the converted polyester polyol) is reacted with an aminoalcohol and/or an aminothiol and a material which is capable of deprotonating the hydroxy group of the aminoalcohol and/or aminothiol. The process of the present invention is generally carried out at temperatures of up to about 150° C. The ether-linked amine-terminated polyesters produced by the process of the present invention are obtained in high yield with a high degree of conversion and include aliphatic and aromatic ether-linked amine-terminated polyesters. A unique characteristic of the claimed process is its ability to produce aromatic amine-terminated polyesters in which the amino group is meta with respect to the ether linkage. A high degree of conversion (i.e., conversions of 60% or greater) to the ether-linked amine-terminated polyesters is achieved by the process of the present invention.

The ether-linked amine-terminated polyesters produced in accordance with the present invention preferably have a functionality of from about 1 to about 16, preferably from about 1 to about 12, most preferably from about 1 to about 6 and a molecular weight of at least 100, preferably from about 106 to about 6,000 and most preferably from about 400 to about 5000. The equivalent weight of these ether-linked amine-terminated polyesters typically ranges from about 100 to about 3000, preferably from about 200 to about 2500.

The converted polyester polyol which is used as a starting material in the practice of the present invention may be prepared from any of the known polyester polyols. Such polyester polyols may, for example, be obtained by reacting polyhydric, preferably dihydric, alcohols with polybasic, preferably dibasic, carboxylic acids, carboxylic acid esters, carboxylic acid anhydrides and derivatives thereof. Hydroxy carboxylic acids or lactones such as caprolactone may also be used. Suitable polyester polyols are described, for example, in Houben-Weyl, Vol. XIV/2, pages 12–29, Thieme Verlag, Stuttgart, 1963.

Polycarboxylic acids useful in the production of polyester polyols may be aliphatic, cycloaliphatic, aromatic or heterocyclic. Examples of suitable carboxylic acids include: oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethyl succinic acid, dimethylol propionic acid and 1,4-cyclohexane dicarboxylic acid. Adipic acid and phthalic acid are particularly preferred acids.

Alcohols useful in the production of the polyester polyols to be used in the process of the present invention include: ethylene glycol; diethylene glycol; triethylene glycol; 1,2- and 1,3-propane diol; 1,4-, 1,3-, 1,2-and 2,3-butanediol; 1,5-pentanediol; 1,6-hexanediol; 1,8-octanediol; neopentyl glycol; 1,4-bis-(hydroxymethyl)-cyclohexane; 2-methyl-1,3-propane diol; alkoxylated bisphenols; hydrogenation products of alkoxylated bisphenols; glycerol; trimethylol propane; 1,2,6-hexanetriol; 1,2,4-butane triol; pentaerythritol; and sorbitol. Ethylene glycol and butylene glycol are particularly preferred.

Suitable polyester polyols include those having functionalities of from about 1 to about 16, preferably from about 1 to about 12, most preferably from about 1 to about 6, and molecular weights of from about 100 to about 6,000.

Substantially all (i.e., at least about 75%) of the hydroxyl groups of the polyester polyol must be replaced with good leaving groups prior to being used in the practice of the present invention. As used herein, the term "good leaving group" means a group which may be displaced at the carbon atom by a nucleophile (e.g., nitrogen, oxygen, sulfur) or an anion of a nucleophile. The rate of displacement by the nucleophile or anion of the nucleophile will, of course, depend upon the chemical nature of the group being displaced. The more stable the group being displaced is as a separate entity, the easier it is to displace that group. For example, iodide is a better leaving group than fluoride because the iodide moiety is more stable than the fluoride moiety.

Many groups which function as good leaving groups in chemical processes are known to those skilled in the art. Any of these known leaving groups may be used in the practice of the present invention. Examples of leaving groups which are preferred in the process of the present invention include: sulfonates (particularly methyl sulfonates), nitrophenoxides, and halides such as chlorides, bromides, and iodides.

Methods for replacing the hydroxyl groups of the polyester polyol with good leaving groups are known to those skilled in the art. In one method which is effective for making such substitution, the polyester polyol is reacted with a halogenation reagent such as carbonyl chloride, thionyl chloride, alkylsulfonylchloride, sodium iodide in trimethylchlorosilane, methanesulfonyl chloride in dimethyl formamide or triphenyl phosphine in carbon tetrachloride. Where a carbonyl chloride is used, the reaction is generally carried out at a temperature of from about 0° to about 40° C. for a period of from about 2 to 8 hours. The resultant chloroformate may then be rearranged at an elevated temperature (e.g., from 75° to 150° C., preferably from about 100° to about 120° C.) or in the presence of a catalyst such as a tertiary amine or amide) to form a polyester alkyl chloride. It is also possible to form the polyester chloride directly by adding carbonyl chloride to a solution of the polyester polyol in N,N-dimethylformamide.

Polyester sulfonates may be prepared by reacting the polyester polyol with methanesulfonyl chloride, optionally in the presence of a tertiary amine or amide. This reaction may be carried out at temperatures ranging from about −30° to about 40° C.

Aminoalcohols and aminothiols useful in the practice of the present invention include those represented by one of the following formulae $$R_1R_2NR_3OH \quad (I)$$

or $$R_1R_2NR_3SH \quad (II)$$

in which $R_1$ represents hydrogen, $R_2$ represents hydrogen, an alkyl, alkenyl, cycloalkyl, aralkyl, or aryl radical, and $R_3$ represents an alkyl, alkenyl, cycloalkyl, aralkyl, aryl, or polyaryl radical.

Such aminoalcohols and aminothiols include: N-aliphatic aminoalcohols, N-aromatic aminoalcohols, aminophenols, substituted aminophenols, diaminophenols, N-aliphatic aminothiols, N-aromatic aminothiols and aminothiophenols.

The material capable of deprotonating the alcohol group of the aminoalcohol used in the practice of the present invention may be represented by one of the following formulae $$M \quad (III)$$

or $$MX \quad (IV)$$

in which

M represents an alkali metal, such as Li, Na, or K and

X represents hydrogen, a hydroxide group, an alkoxide group, $CO_3$, or $R^-$ (where $R^-$ contains a carbon anion).

Specific examples of suitable deprotonating materials include: sodium, sodium hydroxide, sodium hydride, potassium hydroxide, potassium carbonate, methyl lithium, or potassium tert-butoxide.

In a preferred embodiment of the invention, the aminoalcohol and/or aminothiol and deprotonating agent are pre-reacted before being reacted with the converted polyester polyol. It is particularly preferred that the aminoalcohol and/or aminothiol be pre-reacted with the deprotonating agent to form, for example, an aminoalkoxide, when the aminoalcohol or aminothiol is an aliphatic aminoalcohol (i.e., no aromatic ring is present in $R_1$, $R_2$ or $R_3$). This pre-reaction product is then reacted with the converted polyester polyol. This pre-reaction may be carried out at a temperature of from about 0° to about 120 ° C., preferably from about 0° to about 40° C.

When the aminoalcohol and/or aminothiol and deprotonating agent are pre-reacted, they are generally reacted in substantially stoichiometric amounts, although it would be possible to react them in amounts of from about 1.01 mole of deprotonating agent per OH equivalent to about 5 moles of deprotonating agent per OH equivalent.

The reactants used in the process of the present invention are generally reacted in amounts such that the molar ratio of the converted polyester polyol to aminoalcohol and/or aminothiol to deprotonating agent is at least 1:1:1, preferably at least 1:1.02:1.02.

Where the aminoalcohol and/or aminothiol and deprotonating agent are pre-reacted, the ratio of converted polyester polyol to pre-reaction product is generally at least 1:1, preferably from about 1:1.02 to about 1:1.5.

The process of the present invention, pre-reaction of the aminoalcohol and/or aminothiol with deprotonating agent and the replacement of the polyester polyol hydroxy groups with good leaving groups may each be carried out in the presence of a suitable solvent. Examples of suitable solvents include: methylene chloride, toluene, chlorobenzene, dimethylsulfoxide, tetrahydrofuran. Such solvents are not, however, necessary to the practice of the present invention.

The ether-linked amine-terminated polyesters produced by the process of the present invention may be recovered in high yield at a high degree of conversion and purity by any of the techniques known to those skilled in the art. Suitable techniques include filtration and stripping by means of a wiped thin film evaporator.

Having thus described our invention, the following Example is given as being illustrative thereof. All parts and percentages given in this Example are parts by weight and percentages by weight, unless otherwise indicated.

EXAMPLE (a) Approximately 100% of the hydroxyl groups of a polycaprolactone polyester polyol having a molecular weight of 1240 and a functionality of 2 were converted to leaving groups. This conversion was accomplished by combining 0.816 equivalents of the polyester polyol with 0.914 moles of triethylamine and 300 ml of methylene chloride in a three necked flask fitted with a stirrer and a reflux condenser (under nitrogen). 0.914 mole of methane sulfonyl chloride were then added to the flask contents dropwise to the flask. The temperature of the flask was maintained at 25° C. during this addition. The solution was stirred at 25° C. for an additional 30 minutes after the addition was complete and then neutralized with 0.914 mole of sodium hydroxide. Triethylamine, solvent, and water were removed by vacuum stripping. The resulting mixture was filtered to give a clear, almost colorless liquid product which solidified upon cooling. The product had an equivalent weight of about 698 grams per equivalent.

(b) 0.286 moles of 2-aminophenol, 0.011 moles of tetrabutylammonium hydroxide and 800 ml of acetonitrile were added to a second 3-necked flask (under nitrogen). 0.286 equivalents of sodium hydroxide (50% solution) were added to this solution and the contents of the flask were heated at 50° C. for 30 minutes. 0.280 equivalents of the converted polyester polyol prepared in step (a) dissolved in 200 ml of acetonitrile were added to the contents of the second flask and the contents of the second flask were heated at 50° C. for 6 hours. Water and solvent were removed by vacuum stripping. The remaining solution was then filtered. A dark, solid having an amine number of 56.9 was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an ether-linked amine-terminated polyester comprising reacting
   1) a polyester polyol in which substantially all of the hydroxyl groups have been converted to a leaving group with
   2) an aminoalcohol and/or aminothiol and
   3) a material which is capable of deprotonating aminoalcohol and/or aminothiol 2).

2. The process of claim 1 in which aminoalcohol and/or aminothiol 2) and deprotonating agent 3) are reacted prior to reaction with polyester polyol 1).

3. The process of claim 1 in which the hydroxyl groups of polyester polyol 1) have been converted to a leaving group selected from the group consisting of halides, nitrophenoxides and sulfonates.

4. The process of claim 1 in which deprotonating agent 3) is selected from the group consisting of sodium, sodium hydroxide, sodium hydride, potassium hydroxide, potassium carbonate, methyl lithium and potassium tert.-butoxide.

5. The process of claim 1 in which the reaction is carried out at a temperature of from about 50° to about 150° C.

6. The process of claim 1 in which a solvent is present in the reaction mixture.

7. The process of claim 1 in which
   a) polyester polyol 1) is blocked with halide leaving groups and
   b) an N-aliphatic aminoalcohol is reacted with sodium hydroxide to form an aminoalkoxide prior to reaction with the polyester polyol 1).

8. The process of claim 1 in which
   a) polyester polyol 1) is blocked with methyl sulfonate leaving groups,
   b) an aminophenol is used as aminoalcohol 2) and
   c) sodium hydroxide is used as deprotonating agent 3).

9. The process of claim 1 in which
   a) polyester polyol 1) is blocked with methyl sulfonate leaving groups,
   b) an aliphatic aminoalcohol is used as aminoalcohol 2) and
   c) sodium hydride is used as deprotonating agent 3).

10. The amine-terminated polyester produced by the process of claim 1.

11. The amine-terminated polyester produced by the process of claim 7.

12. The amine-terminated polyester produced by the process of claim 8.

13. The amine-terminated polyester produced by the process of claim 9.

* * * * *